(12) United States Patent
Wang

(10) Patent No.: US 6,366,715 B1
(45) Date of Patent: Apr. 2, 2002

(54) FREE SPACE OPTICAL SWITCH WITH LENSES FOR RE-COLLIMATING THE LIGHT

(75) Inventor: Shih-Yuan Wang, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/517,943

(22) Filed: Mar. 3, 2000

(51) Int. Cl.[7] .............................. G02B 6/26; G02B 6/42
(52) U.S. Cl. .......................... 385/17; 385/18; 385/33; 385/34
(58) Field of Search ............................. 385/17, 16, 18, 385/19, 20, 31, 33, 34, 35

(56) References Cited

U.S. PATENT DOCUMENTS

| | | | | |
|---|---|---|---|---|
| 5,255,332 A | * | 10/1993 | Welch et al. | 385/17 |
| 5,283,843 A | * | 2/1994 | Olmstead | 385/16 |
| 5,960,132 A | * | 9/1999 | Lin | 385/18 |
| 6,005,998 A | * | 12/1999 | Lee et al. | 385/33 |

* cited by examiner

*Primary Examiner*—Hemang Sanghavi
*Assistant Examiner*—Scott Knauss

(57) ABSTRACT

A cross-connect switch for switching light signals arriving on N input optical fibers to M output optical fibers. The switch includes N×M mirror elements arranged as N rows and M columns of mirror elements. Each mirror element has a reflecting state and a non-reflecting state. In the reflecting state, each mirror element reflects light from a corresponding one of the input optical fibers to a corresponding one of the output optical fibers. Each mirror element is positioned in the non-reflecting state such that the mirror element does not intercept light from any of the input optical fibers. All of the mirror elements corresponding to a given input optical fiber are located on the same row and all mirror elements corresponding to a given output optical fiber are located in the same column. The switch also includes a plurality of re-collimating lenses. One such re-collimating lens is located between two of the mirror elements in each of the rows of mirror elements. Each re-collimating lens collimates light from the input optical fiber corresponding to that row. The switch also includes one such re-collimating lens between two of the mirror elements in each of the columns of mirror elements.

3 Claims, 1 Drawing Sheet

FREE SPACE OPTICAL SWITCH WITH LENSES FOR RE-COLLIMATING THE LIGHT

FIELD OF THE INVENTION

The present invention relates to optical cross-connect switches, and more particularly, to optical cross-connect switches using micromachined mirrors.

BACKGROUND OF THE INVENTION

Optical fibers provide significantly higher data rates than electronic paths. However, effective utilization of the greater bandwidth inherent in optical signal paths requires optical cross-connect switches. In a typical telecommunications environment, switching of signals between optical fibers utilizes an electrical cross-connect switch. The optical signals are first converted to electrical signals. After the electrical signals have been switched, the signals are again converted back to optical signals that are transmitted via the optical fibers. To achieve high throughput, the electrical cross-connect switches utilize highly parallel, and highly costly, switching arrangements. However, even with such parallel architectures, the cross-connect switches remain a bottleneck.

A number of optical cross-connect switches have been proposed; however, none of these has successfully filled the need for an inexpensive, reliable, optical cross-connect switch. One class of optical cross-connects depends on wavelength division multiplexing (WDM) to affect the switching. However, this type of system requires the optical signals being switched to have different wavelengths. In systems where the light signals are all at the same wavelength, this type of system requires the signals to be converted to the desired wavelength, switched, and then be re-converted to the original wavelength. This conversion process complicates the system and increases the cost.

A second type of optical cross-connect utilizes small mirrors to divert light from a first path into a second path. For example, cross-connect switches constructed from total internal reflection (TIR) switching elements are known to the art. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

Prior art TIR elements that provide a large change in index of refraction operate by mechanically changing the material behind the boundary. For example, one class of TIR element utilizes a gas bubble in an index matching liquid. The gas bubble is shifted into the boundary mechanically or generated at the boundary by heating the liquid. When present, the gas bubble causes the boundary to be reflecting.

Unfortunately, very large cross-connect switches based on TIR elements are not easily constructed. The boundary region between the two waveguides is typically a trench that has been cut into the substrate in which the waveguides were constructed. When the light is crossing this trench, it is no longer in a waveguide and the beam expands. As a result some of the light is not collected by the waveguide on the other side of the trench.

While the losses at a single cross-point are small, the cumulative losses in a large switch render the switch useless. Consider an N×N cross-connect switch for connecting N input optical fibers to N output optical fibers. Each light signal must pass through N−1 cross-points in the transmitting state. Hence, each light signal will suffer an attenuation of $T^{(N-1)}$, where T is the transmission of a single cross-point in the transmitting state. Hence, even in those cases in which the losses are a small fraction of a percent, the signal intensity at the output fiber will be essentially zero after a few hundred cross-points.

In principle, free-space optical cross-connect switches based on mechanically actuated mirrors can avoid the attenuation problems inherent in TIR cross-connect switches. A free-space optical cross-connect switch consists of a two dimensional array of mirror elements. Each mirror element diverts the light from one input fiber to one output fiber. Consider an N×N cross-connect switch. The switch has $N^2$ mirrors arranged in N rows and columns. A light signal is switched from the kth input fiber to the jth output fiber by causing a mirror at the jth column in the kth row to intercept the light signal. All other mirrors on the kth row and jth column are positioned such that those mirrors do not block the path of the light signal. Hence, the light signal is not subjected to any attenuation as it moves along the kth row and down the jth column.

Unfortunately, the size of the mirrors must be large enough to reflect substantially all of the light leaving the output fiber. Since the light is no longer guided when it leaves the optical fiber, the light signal expands because of diffraction. Hence, the mirrors that are far from the end of the fiber must be large enough to reflect substantially all of this light into collimating lens of the output optical fiber. In addition, the spacing between the rows and columns of the mirror array must be sufficient to assure that light traversing any particular row or column will not be picked up by a mirror on an adjacent row or column and thereby cause cross-talk between the fibers.

Broadly, it is the object of the present invention to provide an improved optical cross-connect switch.

It is a further object of the present invention to provide an optical cross-connect that does not require the large mirrors or mirror spacings discussed above.

These and other objects of the present invention will become apparent to those skilled in the art from the following detailed description of the invention and the accompanying drawings.

SUMMARY OF THE INVENTION

The present invention is a cross-connect switch for switching light signals arriving on N input optical fibers to M output optical fibers. The switch includes N×M mirror elements arranged as N rows and M columns of mirror elements. Each mirror element has a reflecting state and a non-reflecting state. In the reflecting state, each mirror element reflects light from a corresponding one of the input optical fibers to a corresponding one of the output optical fibers. Each mirror element is positioned in the non-reflecting state such that the mirror element does not intercept light from any of the input optical fibers. All of the mirror elements corresponding to a given input optical fiber are located on the same row and all mirror elements corresponding to a given output optical fiber are located in the same column. The switch also includes a plurality of re-collimating lenses. One such re-collimating lens is located between two of the mirror elements in each of the rows of mirror elements. Each re-collimating lens collimates light from the input optical fiber corresponding to that row. The switch also includes one such re-collimating lens between two of the mirror elements in each of the columns of mirror elements.

DETAILED DESCRIPTION OF THE INVENTION

Figure 1:
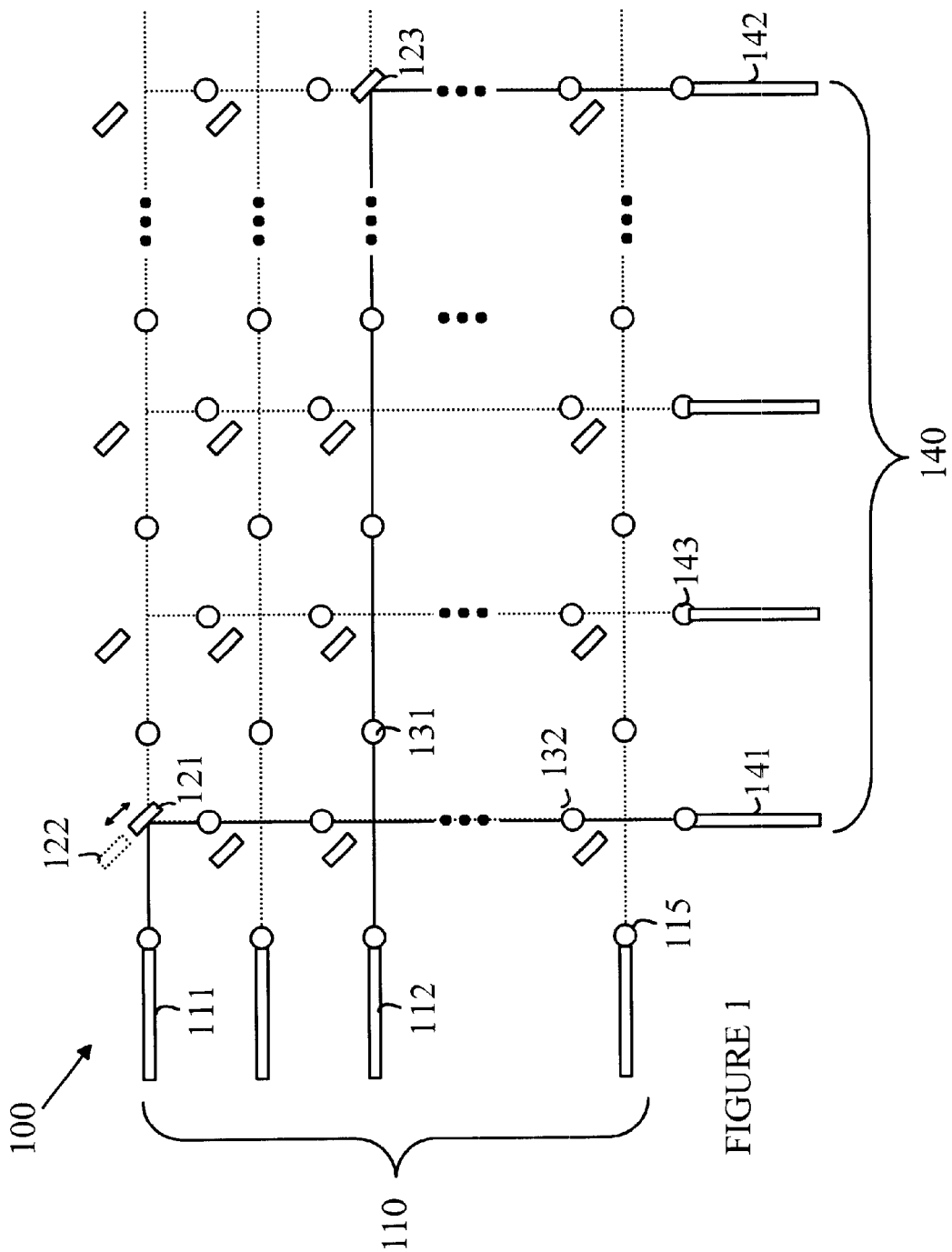
FIG. 1 is a top view of a cross-connect switch 100 according to the present invention.

The manner in which the present invention achieves its advantages over prior art switches can be more easily understood with reference to FIG. 1 which is a top view of a cross-connect switch 100 according to the present invention. Switch 100 according to the present invention connects a set of input optical fibers shown at 110 to a set of output optical fibers shown at 140. Denote the number of input fibers by N and the number of output fibers by M. Switch 100 includes N×M cross-points arranged as N rows and M columns.

Each cross-point includes a mirror that can be positioned to reflect the light from one of the input optical fibers to one of the output optical fibers. For example, mirror 121 is positioned so as to reflect the light from input optical fiber 111 into output optical fiber 141. Similarly, mirror 123 is positioned so as to reflect the light from input optical fiber 112 into output optical fiber 142. When a mirror is not positioned to reflect an input light signal to an output fiber, the mirror is positioned such that it does not intercept any light signal traversing either a row or column. For example, when mirror 121 is not positioned to switch light from fiber 111 to fiber 141, it is positioned as shown at 122. At any given time, at most, one mirror in each row will be positioned to reflect light from an input fiber to an output fiber. The remaining mirrors will be moved to their non-reflecting position.

Any mechanical actuator can be utilized for moving the mirrors between their reflecting and non-reflecting positions. Since the art of micro-machining provides many such mechanisms, particular actuator mechanisms will not be discussed in detail here. Mechanisms that utilize sliding actuators are well known to those in the micro-machining arts. In addition, the mirrors can be positioned on "flip-up" or rotary actuators. The reader is directed to Ming C. Wu, "Micromachining for optical and optoelectronic Systems", IEEE 85, no 11, pp 1833–1856, 1997, which is hereby incorporated by reference, for a more detailed discussion of these techniques.

Each input optical fiber includes a collimating lens to minimize the divergence of the optical beam leaving the fiber. A typical collimating lens is shown at 115. However, in spite of the collimation provided by these lenses, the beam will still diverge because of diffraction. As noted above, this beam divergence causes a problem in large prior art cross-connect switches. For example, the diameter of the beam in prior art cross-connect switches depends on the distance the beam has traveled from the input optical fiber. Hence, the beam diameter at mirror 122 would be much smaller than that at mirror 123. To accommodate this divergence, the mirror size would need to increase with the column number in which the mirror is located, or all of the mirrors would need to be the size of the beam at the last column. This constraint significantly increases the size of the switch.

In addition, the beam diameter at the output optical fibers will be a function of the distance traveled by the beam in reaching the output optical fibers. For example, the beam diameter at output optical fiber 141 for a light signal originating at input optical fiber 115 will be much smaller than that of a light signal originating on optical fiber 111 and ending at optical fiber 142. Accordingly, the collecting lenses 143 on the output optical fibers must be large enough to accommodate the maximum expected beam diameter. This constraint further increases the size of the switch.

The present invention avoids these problems by utilizing a series of additional collimating lens such as ball lenses 131 and 132 to re-collimate the light beams, and thus prevent the beam diameter from becoming too large. In the exemplary switch shown in FIG. 1, a re-collimating lens is included between each pair of switch points in both the rows and columns. These ball lenses reduce the beam divergence, and hence, reduce the problems discussed above. In effect, the series of ball lenses form a free-space optical waveguide. The ball lenses can be positioned with the aid of depressions in the substrate on which the mirrors are constructed utilizing conventional micro-machining techniques.

While switch 100 includes one ball lens between each pair of switch points, it should be noted that many of these lenses can be omitted without substantially increasing the size of the switch. In addition to reducing the cost of the switch, removing the unnecessary ball lenses also reduces optical losses associated with the lenses, and hence, increases the maximum size of a switch according to the present invention. In general, the number of re-collimating lenses needed will depend on the size of the input fibers and the number of cross-points in the switch. Ideally, the re-collimating lenses are positioned such that the beam size at each output optical fiber is less than the diameter of the collecting lens associated with that output optical fiber, independent of the input optical fiber from which the light signal originated. However, switches having as few as one re-collimating lens in each row and column still provide a substantial improvement over prior art switches.

The above-described embodiments of the present invention utilize ball lenses for the collimating lenses. However, it will be obvious to those skilled in the art from the preceding discussion that any form of collimating lens can be utilized. The ball lenses are preferred because they are more easily positioned.

Various modifications to the present invention will become apparent to those skilled in the art from the foregoing description and accompanying drawings. Accordingly, the present invention is to be limited solely by the scope of the following claims.

What is claimed is:

1. A cross-connect switch comprising:

N input optical fibers, wherein N>1;

M output optical fibers, wherein M>1;

N×M mirror elements arranged as N rows and M columns of mirror elements, each mirror element having a reflecting state and a non-reflecting state, each mirror element reflecting light from a corresponding one of said input optical fibers to a corresponding one of said output optical fibers in said reflecting state, and each mirror element being positioned in said non-reflecting state such that said mirror element does not intercept light from any of said input optical fibers, all of said mirror elements corresponding to a given input optical fiber being located on the same row and all mirror elements corresponding to a given output optical fiber being located in the same column; and a plurality of re-collimating lenses, one such re-collimating lens being located between two of said mirror elements in each of said rows of mirror elements, each re-collimating lens collimating light from said input optical fiber corresponding to that row and one such recollimating lens being located between two of said mirror elements in each of said columns of mirror elements.

2. The cross-connect switch of claim 1 wherein the number of re-collimating lenses in one of said rows is less than M−1.

3. The cross-connect switch of claim 1 wherein said re-collimating lenses are ball lenses.

* * * * *